United States Patent [19]
Underhill

[11] Patent Number: 5,289,672
[45] Date of Patent: Mar. 1, 1994

[54] NET SUPPLY APPARATUS FOR ROUND BALERS

[75] Inventor: Kenneth R. Underhill, Lancaster, Pa.

[73] Assignee: Ford New Holland, Inc., New Holland, Pa.

[21] Appl. No.: 917,875

[22] Filed: Jul. 23, 1992

[51] Int. Cl.⁵ .......................................... B65B 11/04
[52] U.S. Cl. ................................... 53/587; 53/389.3
[58] Field of Search ................. 53/118, 389.2, 389.3, 53/587; 242/75.4, 75.43, 75.44, 156.1

[56] References Cited

U.S. PATENT DOCUMENTS

| | | | |
|---|---|---|---|
| 1,861,824 | 6/1932 | Smith | 242/75.44 |
| 2,596,428 | 5/1952 | OMalley | 242/75.4 |
| 2,599,942 | 6/1952 | Roen | 242/75.4 |
| 4,040,043 | 8/1977 | Stanford | 53/389.2 |
| 4,139,165 | 2/1979 | Dyck | 242/75.43 X |
| 4,362,001 | 12/1982 | Cockerham | 53/587 X |
| 4,407,113 | 10/1983 | Core | 53/587 X |
| 4,597,241 | 7/1986 | Clostermeyer | 53/587 |
| 4,604,848 | 8/1986 | Clostermeyer | 53/118 |
| 4,697,402 | 10/1987 | Anstey et al. | 53/587 |
| 4,802,395 | 2/1989 | Merritt, III et al. | 53/587 |
| 4,827,699 | 5/1989 | Shauman | 53/587 |
| 4,956,968 | 9/1990 | Underhill | 53/587 |
| 4,995,216 | 2/1991 | Vansteelant | 53/118 |
| 5,054,263 | 10/1991 | Maki7Rahkola | 53/587 X |

FOREIGN PATENT DOCUMENTS 3617155  11/1987  Fed. Rep. of Germany ........ 53/587

Primary Examiner—John Sipos
Attorney, Agent, or Firm—Frank A. Seemar; Larry W. Miller

[57] ABSTRACT

An agricultural baler for making cylindrical bales of crop material having a sledge assembly moveable between bale starting and full bale positions. The sledge assembly includes a plurality of rollers which cooperate with an apron to define a bale forming chamber. A dispensing mechanism is carried on the sledge assembly for dispensing sheet material, such as net or the like, into the bale forming chamber whereupon it is wrapped circumferentially around a cylindrical bale of crop material in the bale forming chamber. A net supply assembly is associated with the dispensing mechanism to provide net for feeding into the bale chamber via the dispensing mechanism. Included in the net supply assembly is a net brake for restraining the net during various parts of the wrapping process, e.g, cutting. The brake is operated in cooperation with a counter arrangement that includes an idler roll in continuous contact with the surface of the net supply roll.

3 Claims, 7 Drawing Sheets

NET SUPPLY APPARATUS FOR ROUND BALERS

FIELD OF THE INVENTION

This invention relates generally to a baler for forming cylindrical bales of crop material, commonly referred to as a round baler. More particularly, this invention pertains to an improved net supply assembly for round bale net wrapping apparatus.

BACKGROUND OF THE INVENTION

Prior art round balers generally have a bale forming chamber defined by an apron comprising an array of side-by-side belts, transverse slats trained on chains, a plurality of rolls or a combination of these various elements, e.g., rolls and belts. Crop material, such as hay, is picked up from the ground, as the baler travels across the field, and is fed into a fixed or expandable chamber where it is rolled up to form a compact cylindrical hay package. While still inside the bale forming chamber in its compacted form, the outer surface of the package is wrapped with twine or web material, such as net, prior to ejecting the wrapped bale from the chamber onto the ground for subsequent handling.

Exemplary of prior art round balers of the general type mentioned above is the baler disclosed in U.S. Pat. No. 4,956,968 issued in the name of K. R. Underhill on Sep. 18, 1990. In this baler an apron consisting of a combination of rolls and belts is used for bale formation. The baler also includes a mechanism for supplying net to a dispensing assembly which in turn feeds the net material into the bale forming chamber for circumferentially wrapping a formed cylindrical bale. The dispensing mechanism includes a net insertion arrangement having a grasping portion for pulling net from the supply mechanism and inserting the free edge, commonly referred to as the tail, into the chamber. Subsequent to wrapping, the net material is severed by a cutting device.

During various phases of the net feeding and wrapping operation in round balers of this general type a restraining force is applied to the net. This force varies in prior art devices from a substantial braking force providing a significant drag to hold the net under tension for cutting to a minimal force to merely avoid unwanted feeding of slack caused by inertial forces due to the tendency of the supply rolls and/or the rolls along the feed path of various systems to overrun. Examples of prior art devices include the disclosure in U.S. Pat. No. 4,604,848, issued Aug. 12, 1986, showing a braking rod continuously urged against the net supply roll. This system also discloses an additional tensioning system which incorporates the use of a moveable roller, about which the net is wrapped, for applying high web tensioning during cutting or tight wrapping. U.S. Pat. No. 4,697,402, issued Oct. 6, 1987, also shows the use of a rod urged against a net supply roll in conjunction with a net feed tensioning system.

Problems have been encountered in past attempts to accomplish, by simple and reliable means, consistent net tension at a desirable level and during a proper duration while the wrapping operation takes place. It is crucial in net systems that both a continuous minimal tension be applied to enhance the feeding function, and a greater uniform braking force be subsequently applied during net cutting. A drawback of many prior art systems is the complexity of the mechanisms involved and the need to locate such mechanisms in a confined area along the net feed path between the net supply and the bale forming chamber.

SUMMARY OF THE INVENTION

An important object of the present invention is to provide improved round baler net wrapping apparatus that enhances the reliability by consistently providing for required net tension at a desirable level and during a predetermined duration and thereby improves the overall performance and serviceability.

In pursuance of this and other important objects the present invention provides for a new and unique improvement to round baler apparatus having a chamber in which cylindrical bales of crop material are formed, a net supply assembly, means for dispensing net fed from the supply assembly into the bale chamber for wrapping a bale formed in the chamber, means for severing the net after it has been wrapped around the bale, and control means operably connected to the net supply assembly and the severing means so that the net is restrained from further feeding from the net supply assembly under conditions where the bale has been wrapped and the means for severing is operative. According to its broadest aspects the present invention contemplates that the net supply assembly include means for receiving a roll of net, means through which the net is fed from the roll to the dispensing means to thereby reduce the diameter of the roll of net, and a unique net braking means comprising a transverse element having operative and inoperative positions. More particularly, the net supply assembly further comprises a mounting assembly including means for mounting the transverse element for bearing against the outer surface of the roll of net in its operative position to restrain the net from being fed and for mounting the transverse element adjacent and free of contact with the outer surface in its inoperative position.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DESCRIPTION OF THE PREFERRED EMBODIMENT

Figure 1:
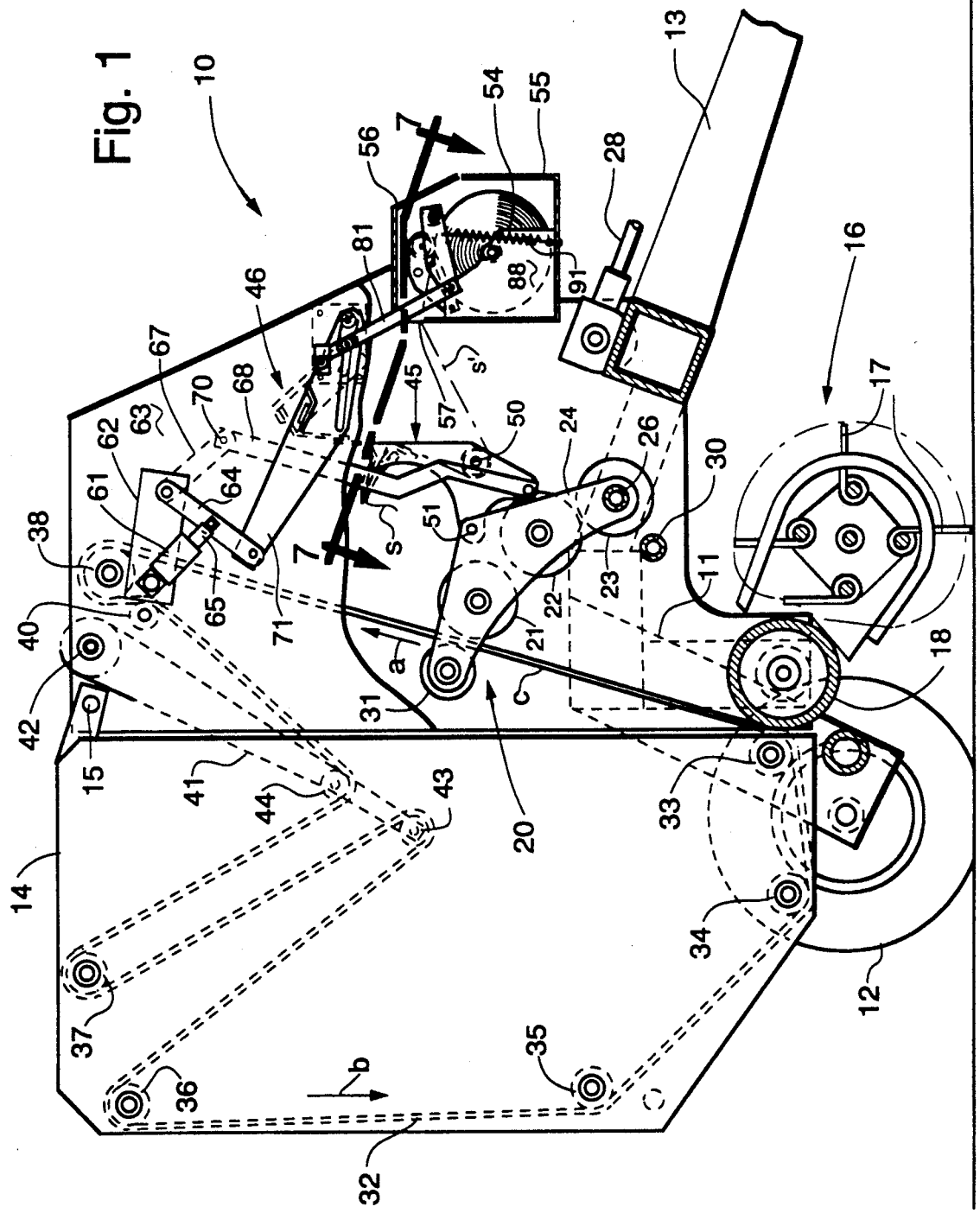
FIG. 1 is a diagrammatic side elevational view of a round baler in which the present invention is embodied and shows the elements in the bale starting position.

Referring now to the drawings for a more detailed description of the preferred embodiment of the invention, FIG. 1 shows a round baler 10 of the type having an expandable chamber defined by belts and rollers, as generally disclosed in U.S. Pat. No. 4,956,958.

Figure 2:
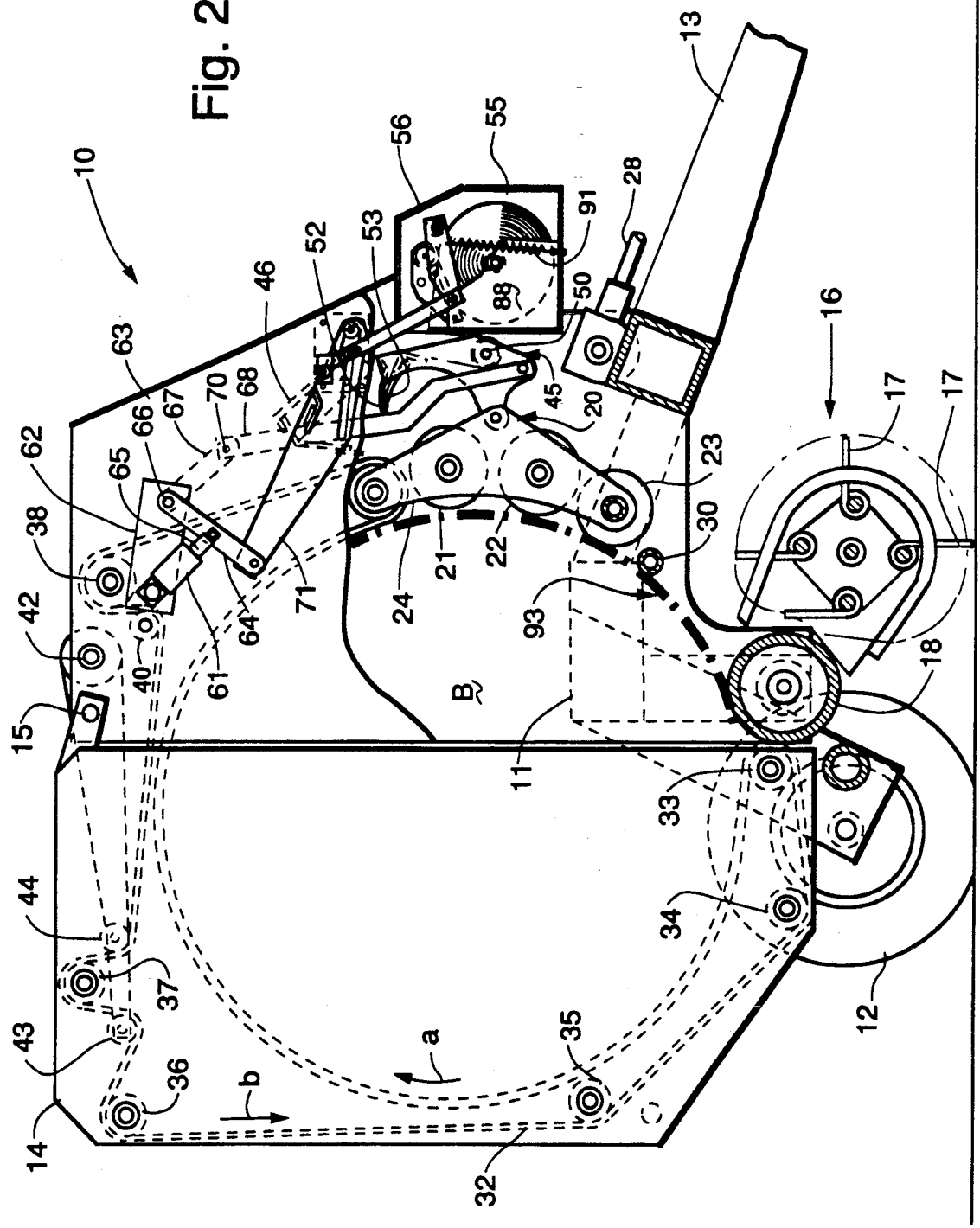
FIG. 2 is a diagrammatic side elevational view similar to FIG. 1 and show the elements in the full bale position.

Round baler 10 incorporates the preferred embodiment of the present invention and includes a main frame 11 supported by a pair of wheels 12 (only one shown). A tongue 13 is provided on the forward portion of main frame 11 for connection to a tractor. Pivotally connected to the sides of main frame 11 by a pair of stub shafts 15 is tailgate 14 which may be closed (as shown in FIGS. 1 and 2) during bale formation or pivoted open about stub shafts 15 to discharge a completed bale. A conventional pickup 16, mounted on main frame 11, is supported by a pair of suitable wheels (not shown). Pickup 16 includes a plurality of fingers or tines 17 movable in a predetermined path to lift crop material from the ground and deliver it rearwardly toward a floor roll 18, rotatably mounted on main frame 11.

Figure 3:
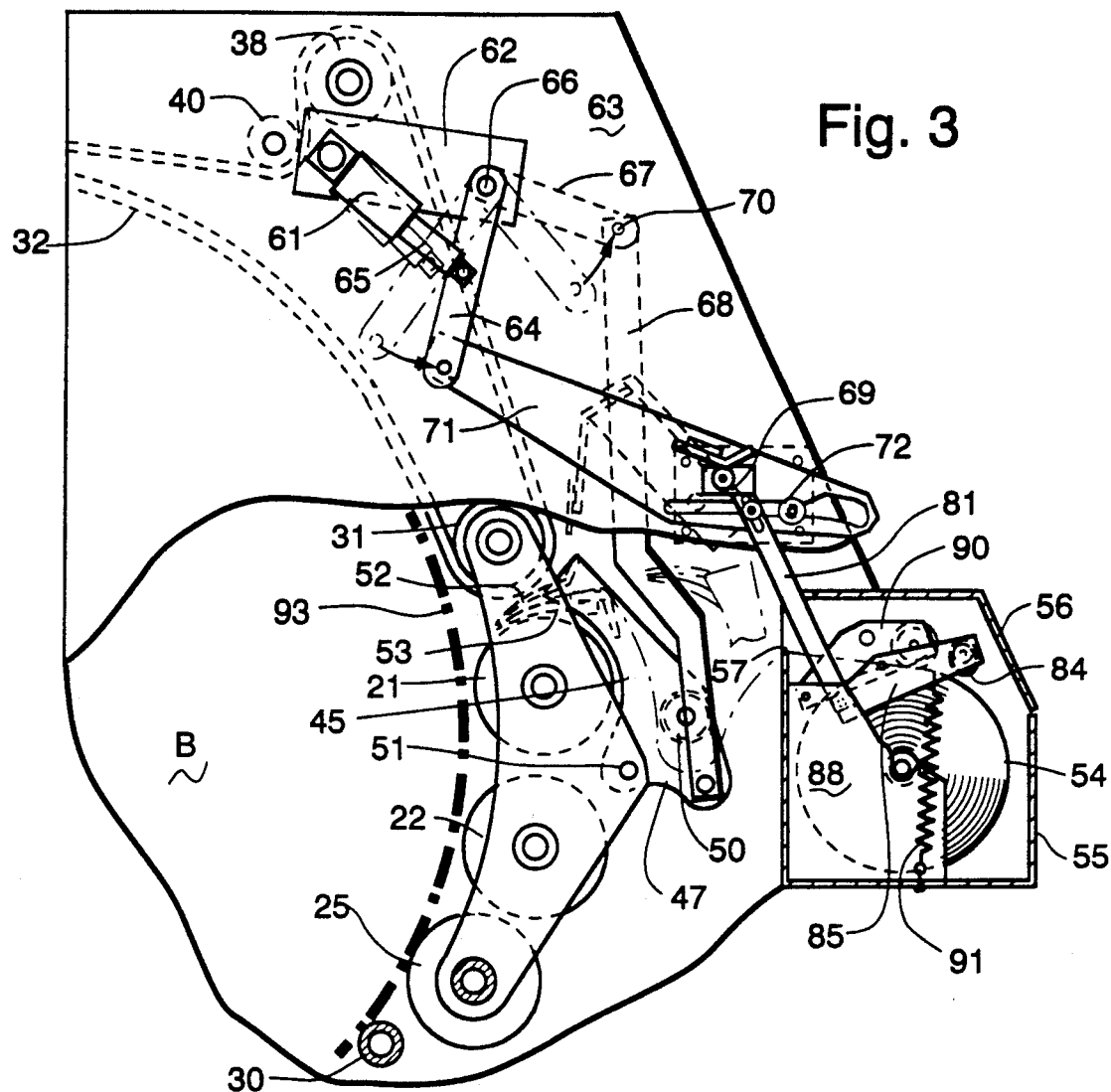
FIG. 3 is a detailed side elevation of the net wrapping apparatus of the baler shown in FIGS. 1 and 2.

The bale forming chamber is defined partly by a sledge assembly 20 comprising a plurality of rollers 21, 22, 23 extending transversely of the main frame 11 in the arcuate arrangement seen in FIG. 1-3. Rollers 21, 22, 23 are journalled at their respective ends in a pair of spaced apart roll carrying arms 24, 25 (see FIG. 7). These arms 24, 25 are pivotally mounted inside main frame 11 on stub shafts 26, 27 for providing movement of sledge assembly 20 between the bale starting position shown in FIG. 1 and the full bale position shown in FIG. 2. Rollers 21, 22, 23 are driven in a counter-clockwise direction as viewed in FIGS. 1-3 by conventional means (for example, chains and sprockets or gears) connected with a drive shaft 28 which is in turn connected to the power-takeoff of a tractor. A starter roll 30 is located adjacent roller 23 and is also driven counter-clockwise. A freely rotatable idler roller 31, also carried by arms 24, 25, moves in an arcuate path with sledge assembly 20 as it moves between its bale starting position (FIG. 1) and full bale position (FIG. 2). Idler roller 31 is clearly depicted in FIG. 7, as are rollers 21 and 23, also.

The bale forming chamber is further defined by a conventional apron 32 comprising a plurality of continuous side-by-side belts supported by guide rolls 33, 34, 35, 36, 37 which are rotatably mounted in tailgate 14. Apron 32 is also supported on a drive roll 38, rotatably mounted on main frame 11. Although apron 32 passes between roller 21 on sledge assembly 20 and idler roller 31, it is only in engagement with idler roller 31 and not roller 21 which is located in close proximity to the apron belts and serves the purpose of striping crop material from the belts, in addition to its bale forming function. Suitable means (not shown) are connected with drive shaft 28 to provide rotation of drive roll 38 in a direction causing movement-of apron 32 along its path as indicated by arrows a and b in FIGS. 1 and 2. An additional guide roll 40 in the main frame 11 ensures proper driving engagement between apron 32 and drive roll 38. A pair of take up arms 41 (only one shown) are pivotally mounted on main frame 11 by a cross shaft 42 for movement between inner and outer positions shown in FIGS. 1 and 2, respectively. Take up arms 41 carry additional guide rolls 43, 44 for supporting apron 32. Resilient means such as coil springs (not shown) are provided to normally urge take up arms 41 toward their inner positions (FIG. 1) while resisting movement thereof to their outer positions (FIG. 2).

When the elements of round baler 10 are disposed in the condition shown in FIG. 1 with tailage 14 closed, an inner course c of apron 32 extends between lower front guide roll 33 and idler roll 31. Rollers 21, 22, 23 in this condition are inclined rearwardly on sledge assembly 20 to define with course c the initial bale forming chamber, or as sometimes referred to, the core starting chamber. Apron inner course c forms the rear wall of the chamber while the inwardly facing moving peripheral surfaces of rollers 21, 22, 23 define a rearwardly inclined cooperating front wall. Floor roll 18 generally defines the bottom of the chamber between the front and rear walls thereof, and starter roller 30 is spaced from floor roll 18 to provide a throat or inlet for the chamber, through which crop material is fed.

As round baler 10 is towed across a field, pickup tines 17 lift crop material from the ground and deliver it through the throat formed between floor roll 18 and roller 30 and thence into the bale forming chamber of baler 10. The crop material is carried rearwardly by floor roll 18 into engagement with apron inner course c (FIG. 1) which urges it upwardly and slightly forwardly into engagement with rollers 21, 22, 23. In this manner crop material is coiled in a generally clockwise direction as viewed in FIG. 1 to start a bale core. Continued feeding of crop material into the bale forming chamber by pickup tines 17 causes the apron inner course c to expand in length around a portion of the circumference of the bale core as the diameter increases. Take up arms 41 rotate from their inner position shown in FIG. 1 toward their outer position shown in FIG. 2 to provide for expansion of the inner course of the apron in a well known manner, i.e., in effect the outer course of the belts of apron 32 are diminished in length while the inner courses increase in a like amount. After a bale has been formed and wrapped with web material, tailgate 14 is opened and the bale is ejected rearwardly. Subsequent closing of tailgate 14 returns the apron inner and outer courses of the belts of apron 32 to the locations shown in FIG. 1, and round baler 10 is ready to form another bale.

It will be understood that during formation of a bale, sledge assembly 20 also moves between a bale starting position (FIG. 1) to a full bale position (FIGS. 2 and 3). This movement of sledge assembly 20 causes idler roller 31 to move in an arcuate path while maintaining apron 32 in close proximity to roller 21, thereby allowing roller 21 to strip crop material from the belts of apron 32 and prevent or reduce significantly the loss of crop material between roller 31 and apron 32 during formation of a bale. Sledge assembly 20 is pushed outwardly towards its full bale position during bale formation as the crop material expands against the rollers and is pulled inwardly by apron 32 to the position shown in FIG. 1 during bale ejection without utilizing any additional mechanisms.

In an alternative embodiment of the round baler 10 which is not shown, apron 32 could comprise a pair of chains connected together at spaced intervals by transverse slats, and the idler roller 31 would be replaced by a pair of idler sprockets engaged with the chains. Aprons consisting of chains and slats are well known in the prior art as substitutes for side-by-side belt aprons. Also in this alternative embodiment the guide rolls would be replaced with guide sprockets for engaging the apron chains, and the drive roll 38 would be replaced by a pair of drive sprockets.

Figure 7:
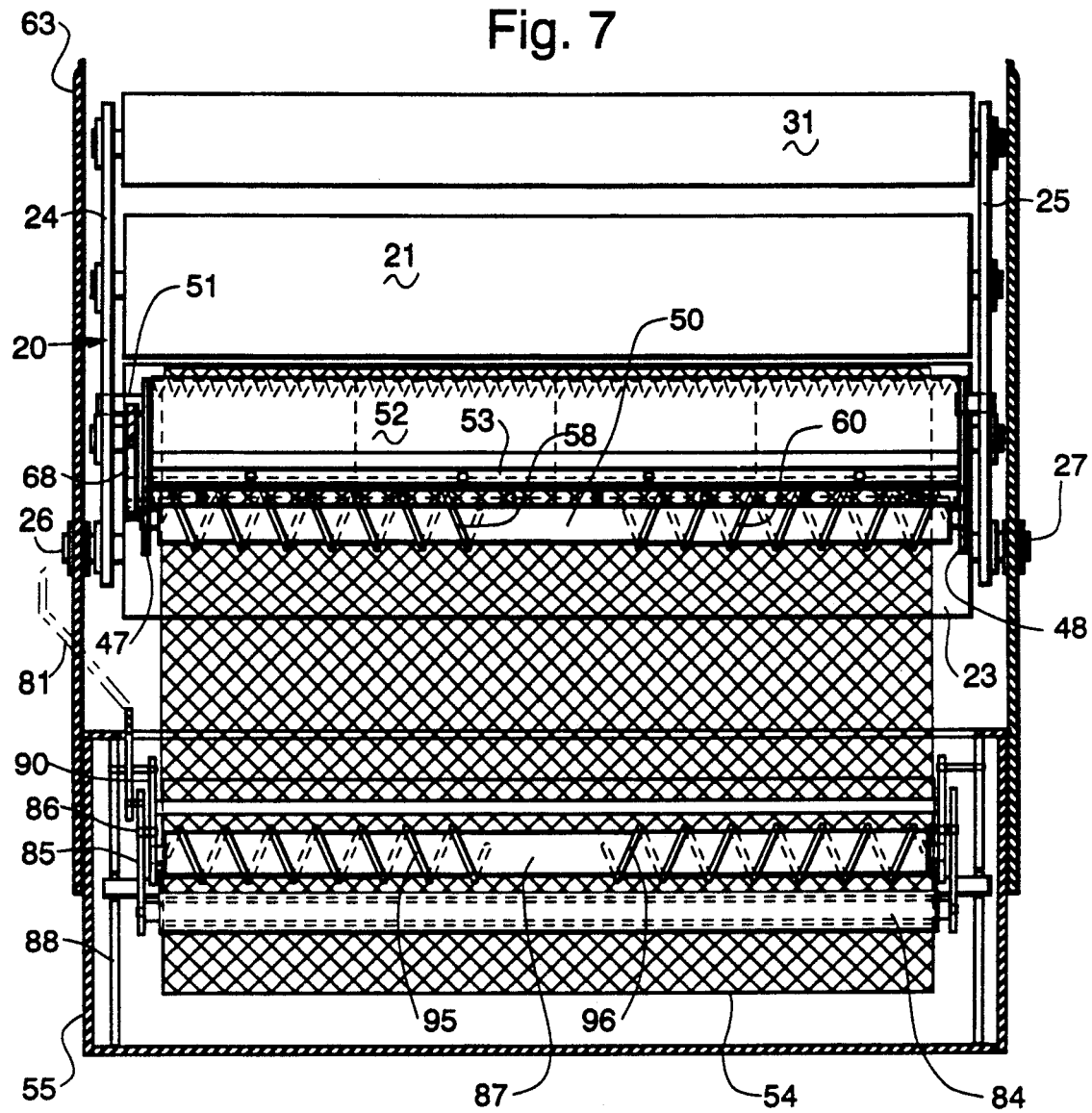
FIG. 7 is a view taken in the direction of arrows 7—7 in FIG. 1.

Now turning to the bale wrapping system in which the present invention is embodied, FIG. 1 shows a net dispensing mechanism 45 pivotally mounted on sledge assembly 20 and an interrelated cutting assembly 46 (phantom outline) pivotally mounted between the side walls on main frame 11. As best seen in FIG. 7, dispensing mechanism 45 comprises a pair of levers 47, 48 spaced apart, inter alia, by a transverse idler roll 50, discussed in further detail below. Levers 47, 48 are rotatably supported on a cross tube 51 that extends between arm 24, 25 of sledge assembly 20. The dispensing mechanism 45 further comprises transverse clamping members 52, 53 (see FIG. 2) also extending between levers 47, 48 and arranged to dispense into the forming chamber web material s, such as net or the like, from a supply roll 54 disposed in a container 55 carried on the baler main frame 11. Container 55 has an access lid 56 to accommodate the placement or removal of supply roll 54. Clamping members 52, 53 may be mounted between levers 47, 48 by bars such as those shown in U.S. Pat. No. 5,036,642, issued Aug. 6, 1991, which clamping structure and mounting arrangement are hereby incorporated by reference. Thus, as the web material s,s' is pulled from supply roll 54 via a slot 57 and guided to clamping members 52, 53 of dispensing mechanism 45, it passes under idler roller 50 which is mounted between and extends transversely of levers 47, 48. Idler roller 50 is provided with net spreading elements 58, 60 affixed to the outer end portions thereof, and spiraled outwardly in a fashion whereby the net passing over idler roll 50 is urged outwardly at the ends.

Referring now to FIGS. 2 and 3, the bale wrapping system also includes an electro-mechanical control system for sequentially actuating a net brake (described in detail below) in conjunction with the net dispensing mechanism 45 as it is moved between a net feeding operative position, as shown in FIG. 3, and a nonoperative retracted position, as shown in FIGS. 1 and 2. This system also provides for proper actuation of the net cutting assembly 46 to avoid a premature release. To this end, an electric actuator 61 is shown in its retracted position in FIGS. 1 and 2 whereas in FIG. 3 it is shown in solid lines in its extended position while the retracted position is shown in phantom outline.

Actuator 61 is pivotally mounted to plate 62, which is affixed to the outer surface of sidewall 63 of mainframe 11. A link member, 64, pivotally attached to actuator element 65, is pivoted about fixed pivot pin 66 between the retracted position shown in FIGS. 1 and 2 and the extended position shown in FIG. 3. Affixed to and adapted for rotation with a pin 66 and inwardly of side wall 63 is lever 67 shown downwardly inclined in FIGS. 1 and 2 in the non-actuated position of actuated element 65. A net dispensing actuator arm 68 is pivotally connected to lever 67 via pin 70 inwardly of wall 63, whereby actuator arm 68 moves to the upward position shown in FIG. 3 under conditions where actuator element 65 is extended. When actuator element 65 is retracted, arm 68 is moved downwardly and net dispensing mechanism 45 is moved to the retracted nonoperative position (FIG. 2).

Figure 5:
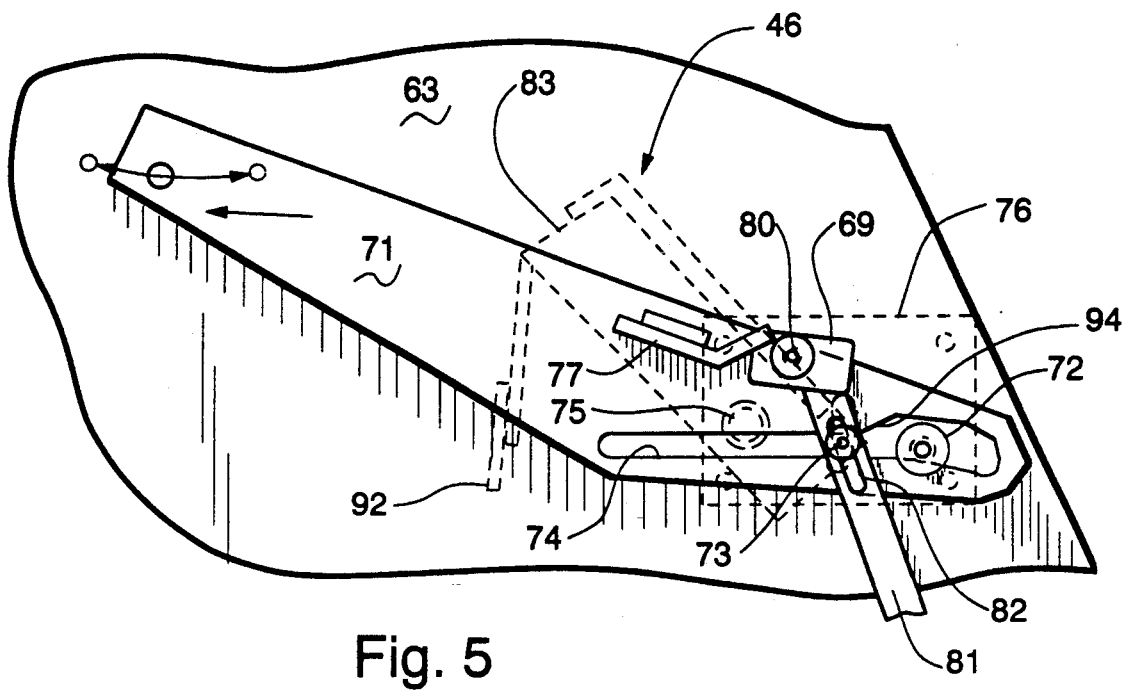
FIG. 5 is a detailed side elevational view of a control mechanism for the net wrapping apparatus shown in FIG. 3.
Figure 6:
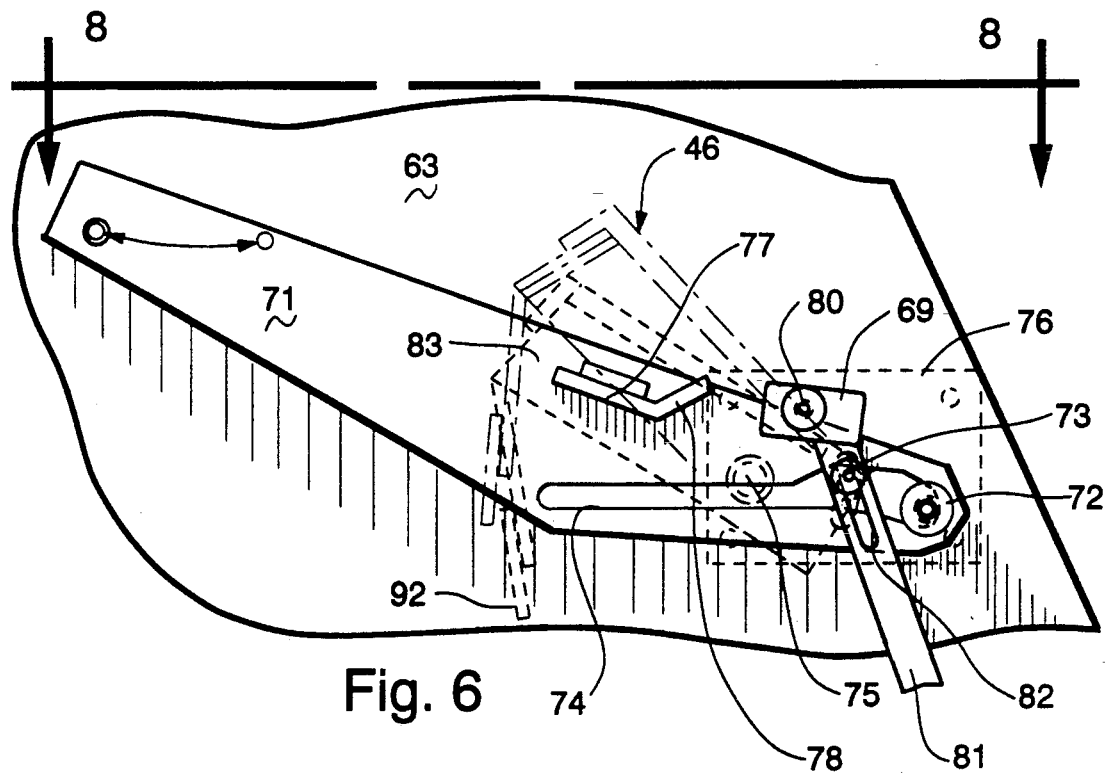
FIG. 6 is also a detailed side elevational view of the control mechanism for the net wrapping apparatus shown in FIG. 3 and shows the elements in an operational position different than shown in FIG. 5.
Figure 8:
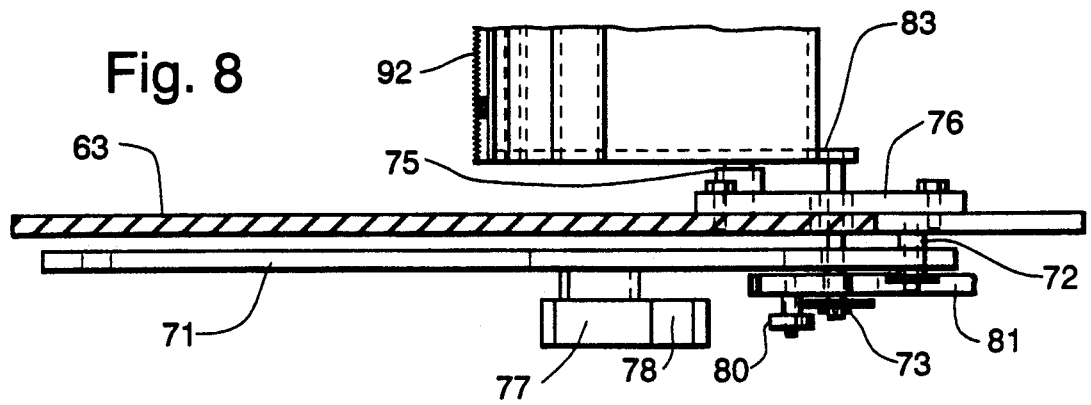
FIG. 8 is a view taken in the direction of arrows 8—8 in FIG. 6.

Pivotally attached to the lower end of link member 64 is a transverse control arm 71 which reciprocates in a generally for and aft direction in response to the position of actuator element 65. The right end of control arm 71 is primarily supported by fixed flanged roller 72 and secondarily supported by knife control roller 73 see FIGS. 5 and 6, both of which extend through control arm slot 74. FIGS. 5,6 and 8 show control arm 71 in detail with FIG. 6 depicting conditions where actuator element 65 (not shown in FIGS. 5 & 6) is fully retracted, and FIG. 5 showing control arm 71 and related elements in an intermediate condition. Net cutting assembly 46 pivots around a fixed pivot via a stub shaft 75 affixed to plate 76 secured to the inside surface of side wall 63.

Figure 4:
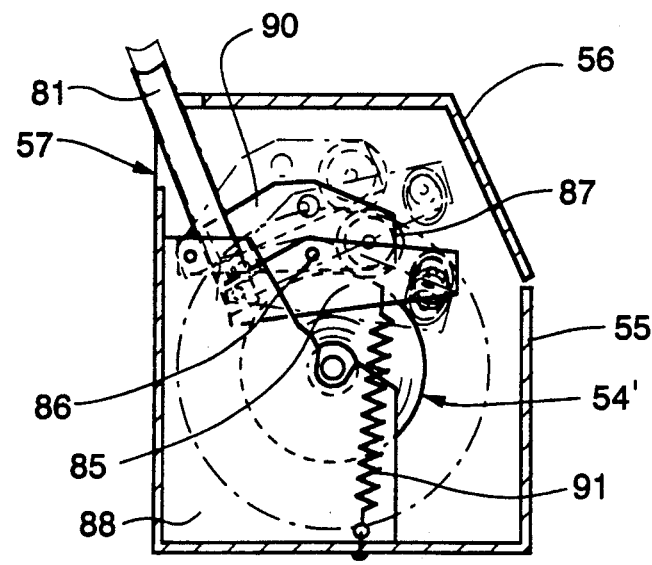
FIG. 4 is a side elevational view of the net roll supply system used in the net wrapping apparatus shown in FIG. 3.

Secured in the intermediate area of control arm 71 is a ramp element 77 having a ramp section 78 (FIG. 6) positioned to engage a roller 80 secured to a leg member 69 which is integral with net brake control arm 81. A slot 82 in brake control arm 81 cooperates with knife roller 73 which is secured to knife side plate 83, which roller guides brake arm 81 along a reciprocal path via slot 82. As shown generally in FIG. 3, brake arm 81 is in its lowermost position when actuator element 65 is in its extended position, and thereby lifts net brake element 84 from the surface of the net supply roll by pivoting brake mounting arm 85 counterclockwise around pin 86 (FIGS. 4 and 7). A counter roll 87 is pivotally mounted on a fixed bracket 88 via a counter roll mounting arm 90 and continually held in contact with the surface of net supply roll 54 by means of spring 91 which urges brake mounting arm 85 downwardly and in turn also urges counter roll mounting arm 90 downwardly. The number of rotations of roll 87 accurately determines the amount of net dispensed from roll 54. Thus, by counting the number of rotations of the counter roll the desired length of net dispensed can be determined by the known circumference of the bales being formed along with the desired number of wraps or fractional wraps.

FIG. 4, which shows the net supply assembly in general, illustrates the position of brake element 84 and counter roll 87 when the net from supply roll 54' has been partially depleted. This unique arrangement described in further detail below provides for continuous contact between net supply roll 54' and counter roll 87 without changing the spacial relationship between brake element 84 and the surface of the net roll, thereby providing for a substantially constant braking force regardless of roll size.

Net cutting assembly 46 includes a pair of knife side plates 83 (only one shown) rotatably supported on stub shaft 75. A knife 92 (only partially shown in FIG. 8) is carried by and extends transversely between knife side plates 83 for engagement with the net material dispensed by dispensing mechanism 45. A similar net cutting assembly that operates in the same general manner is shown in U.S. Pat. No. 5,036,642. For the purposes of this invention it is believed that the diagrammatic outline showing a cutting assembly in various positions will suffice.

Turning again to the net supply assembly set forth in FIGS. 3 and 7, details of the present invention are more specifically shown in FIGS. 9, 10, 11 and 11a. A partially depleted net supply roll 54' is mounted for rotation about a shaft 93 supported by bracket 88. It should be pointed out that shaft 93 extends through supply roll 54' and is supported by a bracket similar to bracket 88 at its opposite end. For the purposes of this description reference will only be made to the elements shown in FIGS. 9 and 10 and in those instances where like or similar elements are utilized at the other side of the assembly it will be presumed to be self evident. In this regard, in the description material hereinabove directed to FIG. 7 the same reasoning was used.

Figure 9:
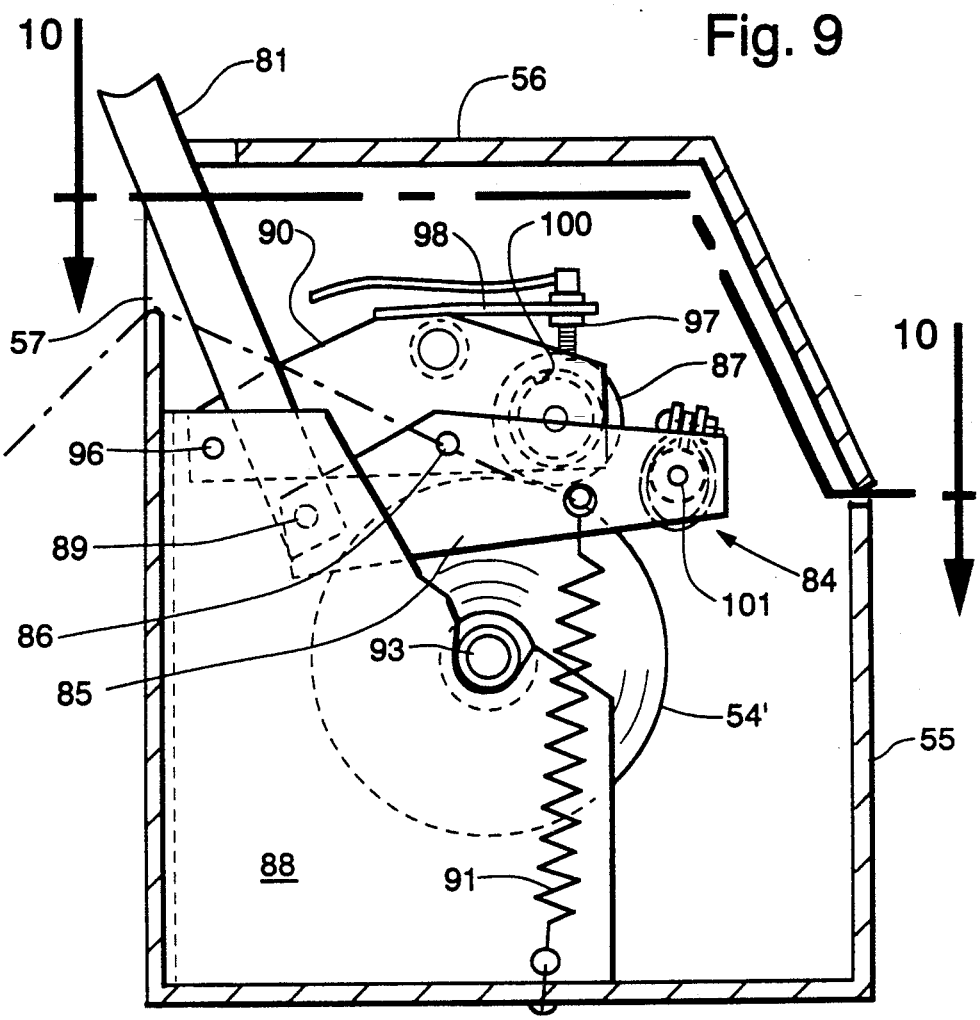
FIG. 9 is a detailed side elevational view of the net supply assembly of the present invention.
Figure 11:
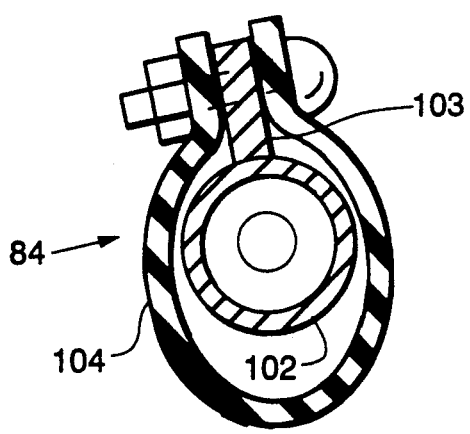
FIG. 11 is a view taken in the direction of arrows 11—11 in FIG. 10 and shows the parts of the brake element in detail.
Figure 11A:
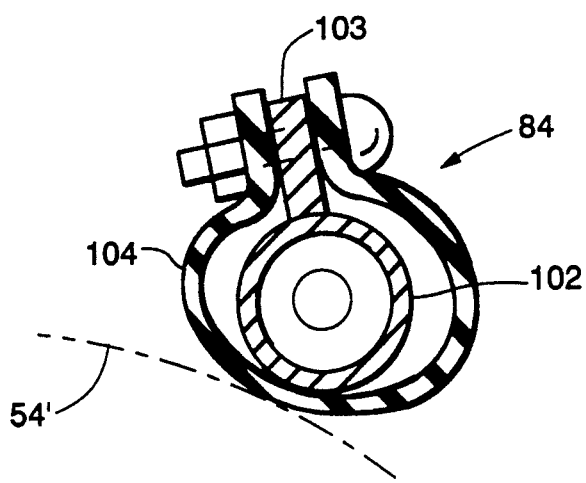
FIG. 11a is similar to FIG. 11 and shows the brake element parts in a different operative position.
Figure 10:
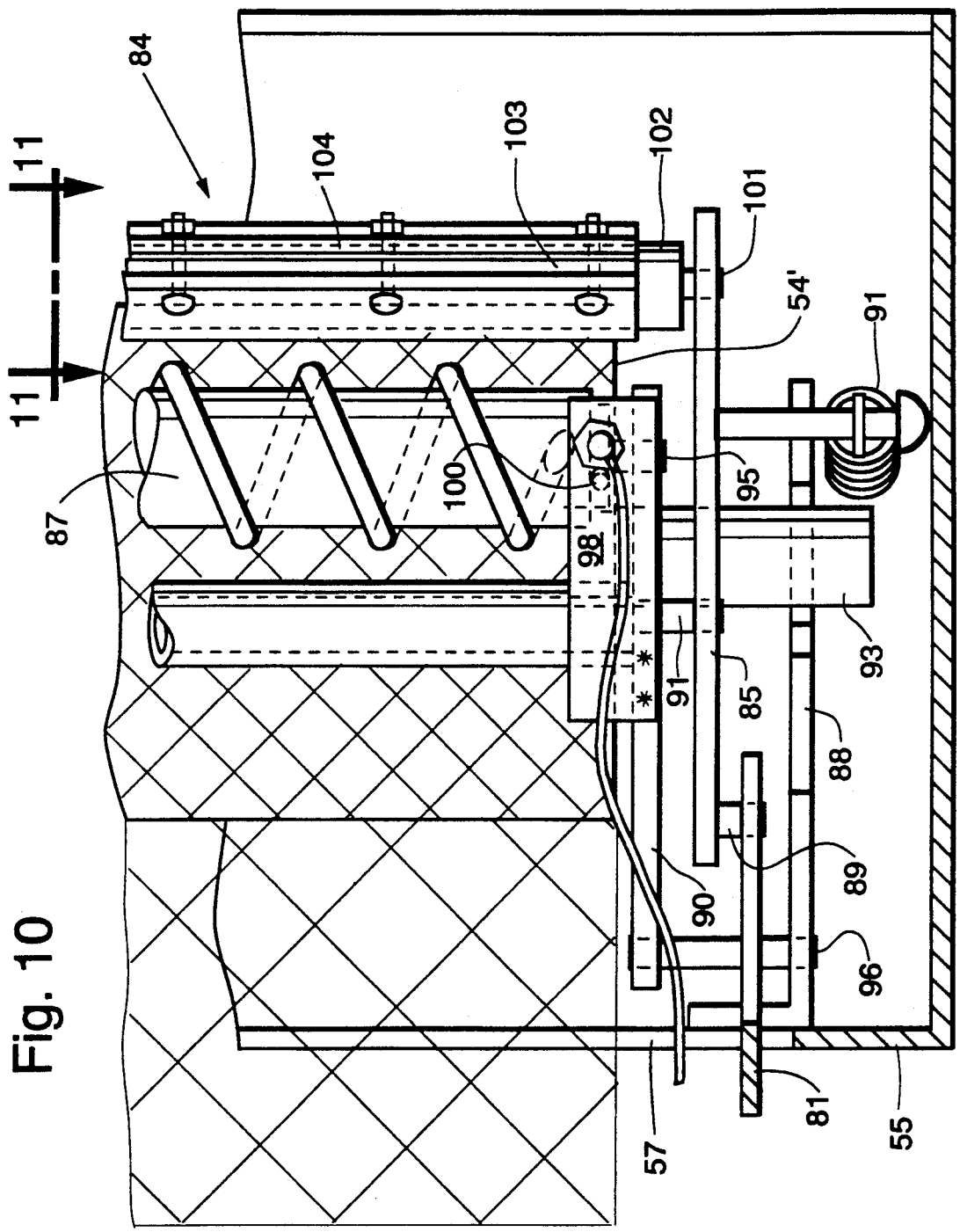
FIG. 10 is a view taken in the direction of arrows 10—10 in FIG. 9.

Net brake control arm 81 is depicted in the downwardly extended position in FIGS. 9 and 10, i.e., roller 80 is fully engaged by ramp element 77. Brake mounting arm 85 is pivotally secured to control arm 81 by a pin 89 and urged downwardly by spring 91, which also holds counter roll 87 against supply roll 54'. Counter roll 87 is mounted on counter roll mounting arm 90 via a stub shaft 95, which arm 90 is pivotally mounted on bracket 88 by a pivot pin 96, and thus when arm 81 is held in its downwardly extended position spring 91 urges brake mounting arm 85 clockwise about pivot pin 89 and in so doing pulls counter mounting arm 90 in the same direction about pin 96 by virtue of interconnecting pivotal engagement at pin 86.

An electronic sensor 97, mounted on arm 90 by mounting bracket 98, is disposed adjacent the path of a permanent magnet 100 adapted to pass sensor 97 and emanate a magnetic signal each time counter roll 97 rotates. This electronic signal is used to count the rotations of counter roll 87 which in turn is directly proportional to the circumference of the roll which is held in frictional contact with the net. Thus, the number of rotations of counter roll 87 is directly proportional to the net being fed from supply roll 54' to the net dispensing mechanism.

Brake element 84, mounted on brake mounting arm 85 by a pin 101, comprises a rigid transverse bar 102 and an integral transverse flange 103 extending outwardly therefrom in a generally radial direction. Secured to flange 103 is a flexible outer sleeve 104 enclosing bar 102. Sleeve 104, which is shown continuous along bar 102 but could comprise a series of side-by-side like elements for ease of assembly, is readily deformable against bar 102 (see FIG. 11a) when element 84 is urged downwardly into the operative position. The material used for sleeve 104 provides a frictional contact with the net in the engaged position along the full width of supply roll 54' regardless of irregularities of the surface and the size of the roll.

The operation of baler 10 will be described by first turning to the point at which bale B has been formed and it is ready to be wrapped with net material, electric actuator 61 is activated while apron 32 continues to rotate bale B in a clockwise direction as viewed in FIG. 2. The outer surface of bale B is generally illustrated by heavy broken lines 93 in FIGS. 2 and 3. Actuator element 65 of electric actuator 61 drives control arm 71 from left to right and net dispensing actuator arm 68 from the position shown in FIG. 2 to the position shown in FIG. 3. This rotates the dispensing mechanism 45 from the position shown in FIG. 2 to position shown in FIG. 3. As the dispensing mechanism 45 moves toward its dispensing position (FIG. 3), the cutting assembly 46 is rotated clockwise to the non operative position shown in FIG. 3 and clamping members 52, 53 move into the gap between roller 21 and apron 32. Meanwhile, net brake element 84 has been removed from the surface of supply roll 54 while counter roll 87 is maintained in operative contact therewith permitting the tail of the net material gripped between clamping members 52, 53 to be fed out and inserted through the gap into the bale forming chamber. The tail is dragged downwardly by frictional contact with the outer surface of bale B and ultimately caught in the nip between roller 21 and bale B which are rotating in opposite directions. The net material is then dispensed along a path from the supply roll 21 via slot 57, around idler roller 50, between clamping members 52, 53, and then through the gap into the bale forming chamber where it is wrapped circumferentially around bale B while the bale continues to be rotated by apron 32. Counter roll 87 maintains light continuous contact with the surface of supply roll 54, at all times, thus permitting a minimum drag during dispensing and an accurate count of the number or fractional number of rotations of roll 87.

After bale B has been wrapped with one or more layers of the net material (usually 2 to 4 wraps), electric actuator 61 is reversed thereby moving dispensing mechanism 45 from the position shown in FIG. 3 to the position shown in FIG. 2. When dispensing mechanism 45 has been retracted, net cutting assembly 46 is rotated counterclockwise (FIG. 6) so that knife 92 is brought downwardly at the appropriate time into contact with the expanse of net material extending from clamping members 52, 53 of dispensing mechanism 45 to the periphery of roll 21. More specifically, knife side plates 83 rotate about stub shaft 75 under conditions where knife control roller 73 slides upwardly in brake arm slot 82 upon reaching the ramp 94 in slot 74 in transverse control arm 71. Knife 92 cuts the net material in a known manner and leaves a succeeding tail which is gripped by clamping members 52, 53 for future insertion into the bale forming chamber when the next bale is ready to be wrapped with net material. Prior to cutting, the net brake has been actuated by control arm 81 which travels upwardly via slot 82 when ramp 78 is clear of roller 80, which actuation permits braking force (also referred to as drag) to be applied on the net resulting in necessary tension during cutting.

Now turning to the unique relationship of the elements of the net supply assembly with particular focus directed to the manner by which brake element 84 and counter roll 87 interrelate to provide improved reliable results. Counter roll is held in continuous contact with the surface of the supply roll regardless of its amount of depletion. This enhances the feeding function and prevents back lash as well as the need for accuracy in the counting function which necessitates continuous slip-free contact between the counter roll surface and the net as it is fed from the supply assembly.

Equally as important is the need for selectively increasing net tension to a consistently predictable force level and duration. Brake element 84 is poised in its non-contact position at a constant distance regardless of net depletion. When engaged, element 84, comprising a unique outer sleeve 104, is adapted to provide a uniform drag or braking force across the full transverse expanse of the net for proper cutting. By varying spring force of spring 91 this drag can be varied to any desired amount necessitated by the type of web material being used for wrapping. For example, the net's flexibility, durability and/or frictional coefficient all have a bearing on the amount of braking force desirable to provide effective wrapping. In some instances, depending upon the net material being used and the crop material being baled, it has been found to be desirable to reroute the net path so that the supply roll feeds out while rotating clockwise as opposed to counterclockwise, as shown. In this situation the net path is sinuous or generally S-shaped as it passes from the supply roll to the counter and thence out slot 57. This variation of the supply assembly of the present invention is readily adaptable to serve the same improved function of the net wrapping apparatus.

While the preferred structure in which the principles of the present invention have been incorporated is shown and described above, it is to be understood that the invention is not to be limited to the particular details, as shown and described above, but that, in fact, slight variations of the type referred to above or widely different means may be employed in the practice of the broader aspects of the invention.

Having thus described the invention, what is claimed is:

1. In a round baler having a chamber in which cylindrical bales of crop material are formed,
   a net supply assembly,
   means for dispensing net fed from said supply assembly into said bale chamber for wrapping a bale formed in said chamber,
   means for serving said net after it has been wrapped around said bale,
   control means operably connected to said net supply assembly and said severing means so that said net is restrained from further feeding from said net supply assembly under conditions where said balse has been wrapped and said means for severing is operative, the improvement comprising
   said net supply assembly including means for receiving a roll of net,
   means through which said net is fed from said roll to said dispensing means to thereby reduce the diameter of said roll of net,
   net braking means comprising a transverse element having operative and inoperative positions,
   a mounting assembly including means for mounting said transverse element for bearing against the outer surface of said roll of net in said operative position to restrain said net from being fed and for being adjacent and free of contact with said outer surface in its inoperative position,
   said transverse element comprises a rigid transverse bar extending generally parallel to said roll of net, and flexible means secured to and moveable with said transverse bar,
   said flexible means interposed between said rigid bar and the outer surface of said roll of net for operative contact with the outer surface of said roll of net under conditions where said net braking means is in said operative position, and
   said flexible means encompasses at least a portion of said rigid bar and is spaced therefrom under conditions where said net braking means is in said inoperative position.

2. In a round baler having a chamber in which cylindrical bales of crop material are formed,
   a net supply assembly,
   means for dispensing net fed from said supply assembly into said bale chamber for wrapping a bale formed in said chamber,
   means for severing said net after it has been wrapped around said bale,
   control means operably connected to said net supply assembly and said severing means so that said net is restrained from further feeding from said net supply assembly under conditions where said bale has been wrapped and said means for severing is operative, the improvement comprising
   said net supply assembly including means for receiving a roll of net,
   means through which said net is fed from said roll to said dispensing means to thereby reduce the diameter of said roll of net,
   net braking means comprising a transverse element having operative and inoperative positions,
   a mounting assembly including means for mounting said transverse element for bearing against the outer surface of said roll of net in said operative position to restrain said net from being fed and for being adjacent and free of contact with said outer surface in its inopertive position,
   said means formounting said transverse element comprise means for maintaining said element at a predetermined distance from said roll, regardless of the diameter of said supply roll, under conditions where said transverse element is in said inoperative position,
   said net supply assembly further includes an idler roll,
   said mounting assembly includes means for mounting said idler roll in operative contact with the outer surface of said supply roll for rotation at the same peripheral speed as the surface of said supply roll,
   said mounting means for said idler roll comprises a pair of lever arms between which said idler roll is mounted for rotation, said lever arms pivotally mounted,
   means for pivotally urging said lever arms to maintain said idler roll in said operative contact with the outer surface of said supply roll, said means for mounting said transverse element further comprise
   a second pair of lever arms between which said transverse element is mounted, said lever arms pivotally mounted, and
   said means for pivotally urging also urging said second pair of lever arm to maintain said transverse element at said predetermined distance in said inoperative position and against said roll in said operative position.

3. A round baler as set forth in claim 2 wherein said second pair of lever arms are pivotally mounted on said pair of lever arms.

* * * * *